United States Patent [19]

Barkhoudarian

[11] Patent Number: 4,523,482
[45] Date of Patent: Jun. 18, 1985

[54] LIGHTWEIGHT TORQUEMETER AND TORQUE-MEASURING METHOD

[75] Inventor: Sarkis Barkhoudarian, Canoga Park, Calif.

[73] Assignee: Rockwell International Corporation, El Segundo, Calif.

[21] Appl. No.: 528,915

[22] Filed: Sep. 2, 1983

[51] Int. Cl.³ .............................................. G01L 3/10
[52] U.S. Cl. ................................. 73/862.36; 324/209
[58] Field of Search ......... 73/862.28, 862.36, DIG. 2; 324/209

[56] References Cited

U.S. PATENT DOCUMENTS 3,427,872 2/1969 Leep et al. .
3,783,370 1/1974 Birdwell et al. .
3,861,206 1/1975 Kawafune et al. .

FOREIGN PATENT DOCUMENTS 1900194 7/1970 Fed. Rep. of Germany .
0147580 4/1981 German Democratic Rep. .

OTHER PUBLICATIONS

G. M. Walker, "Wiegand's Wonderful Wires", *Popular Science*, May 1979.
*Wiegand Effect Design Guide*, Sensor Engineering Co., Jan. 1979.

Primary Examiner—Charles A. Ruehl
Attorney, Agent, or Firm—H. Fredrick Hamann; Harry B. Field

[57] ABSTRACT

A torquemeter 10 comprising a magnetostrictive element 12 which is formed in the shape of a ribbon upon the surface of the subject rotating member 14 and is capable of producing internal, avalanche Barkhausen reversals, permanent magnets 16 and 18 positioned adjacent to the subject rotating member 14 for successively triggering the avalanche Barkhausen reversals in the magnetostrictive element and for resetting the magnetostrictive element after each reversal, a pickup coil 20 for generating signals responsive to the avalanche Barkhausen reversals and a readout circuit 22 in communication with pickup coil 20 for correlating the responsive signals to an indication of the level of torque and/or power in the subject rotating member 14.

20 Claims, 9 Drawing Figures

LIGHTWEIGHT TORQUEMETER AND TORQUE-MEASURING METHOD

BACKGROUND OF THE INVENTION

1. Field of Invention

This invention relates to a method and apparatus for measuring torque and/or horsepower of a rotating object by creating and measuring avalanche Barkhausen reversals of the magnetic polarity in an element formed upon the rotating object.

2. Discussion of the Prior Art

To date, torque and/or horsepower measurement has not become a commonly used parameter for controlling rotating machinery due to the lack of a sufficiently small, lightweight, durable torquemeter. Torquemeters of the prior art use one of several approaches for measuring torsional stress within a rotating shaft. One approach generates torque-responsive signals from a strain gage cemented to the target shaft and passes these signals to an external receiver through electrical brushes in contact with slip rings on the shaft. The slip rings and brushes, however, degenerate from wear and the output signal of the strain gage is of low amplitude and exhibits erratic drift due to creep of the cement. More importantly, however, this approach requires that the strain gage and slip rings be attached to the rotating shaft and these additions often affect the original shaft balance in a manner which can reduce the life and performance of the machinery. Moreover, these devices generate signals which vary responsively only according to amplitude and they exhibit a poor signal at the higher rotational speeds due to the noise generated by the pick-up brushes. These shortcomings are of particular concern in connection with ultra-high speed rotating machinery such as rocket turbopumps, gas turbine engines and reciprocating engines, wherein the maintenance of shaft balance is critical and rotational speeds can be extreme. Moreover, these types of torque meters generate no indication of the rotational speed of the shaft, and thus they require an additional sensor such as a magnetic pickup device in order to determine rotary speed information necessary for the measurement of horsepower.

Another method for measuring the torsional stress in a rotating shaft employs a first magnetic coil to impart a bias magnetization within the shaft and a second coil in proximity to the first for detecting changes in the bias magnetization as the rotating shaft is placed uder torsional loading. A typical example of such an arrangement can be found in U.S. Pat. No. 3,861,206 to Kawafune et al. In another example, shown in U.S. Pat. No. 3,427,872 to Leep et al, a first coil and/or magneto-coil element induces magnetization into the test specimen and uses a second coil means for detecting Barkhausen noise as the biasing magnetization in the specimen is varied. However, the quality of the signal obtainable from these devices is highly dependent upon the rotational speed of the target shaft and are usually too faint and too slow in response time to give meaningful analysis of stress and/or torque in rapidly rotating shafts or the like. More importantly, Barkhausen noise evidences only a very weak signal. Consequently, the signal is sensitive to interference from other circuitry and its detection requires acutely sensitive and therefore costly sensing and amplification devices.

Yet another method of the prior art for measuring torque of a rotating subject employs a plurality of induction coils and a strain gage, wherein a first induction coil external to the rotating subject induces a current in a second coil secured to the rotating subject. The induced current is directed to a strain gage secured to the rotating subject by cement or other means. The strain gage then produces a signal which is responsive to the torsional strain carried by the rotating subject, which signal is conveyed to another external induction coil by means of yet another coil secured to the rotating subject. Because of the number of induction coils employed by this method and because of the losses associated therebetween, this method is extremely disadvantageous in terms of weight, power requirements and its effect on the original balance of the rotating subject. Furthermore, its output signals are usually so weak as to require extensive amplification, which requirement adds further to its complication and bulkiness as a system. Like the other methods, it also provides very unsatisfactory performance at the higher rotational speeds.

OBJECTS OF THE INVENTION

Accordingly, it is an object of the present invention to provide a small, lightweight, durable torque meter shich exhibits a greatly enhanced range of operation over devices of the prior art.

It is yet another object of the present invention to provide a torquemeter which does not compromise the rotational balance of the machinery to which it is applied.

Yet another object of the present invention is to provide a torquemeter having a reading which accurately measures either torque or horsepower and which is not appreciably affected by the speed of rotation of the target machinery and does not drift with time.

It is still a further object of the present invention to provide a highly accurate torquemeter which does not require the use of strain gages, slip rings, brushes, large induction coils or other articles which might require periodic replacement or upset the original balance of the rotating subject of interest.

Even yet another object of the present invention is to provide a torquemeter which is easy to apply to nonferromagnetic shafts.

It is another object of the present invention to provide a torquemeter which does not require large or expensive detectors or amplifiers for processing the responsive signal, nor an electrical oscillator for generating a responsive signal.

It is yet another object of the present invention to provide a torquemeter which can generate responsive signals at very low speeds with sufficient pulse amplitudes such that the torquemeter is useable for start/stop transient measurements and control applications.

It is still another object of the present invention to provide a torquemeter having extremely fast response time so that it can accurately measure transient conditions.

It is yet another object of the present invention to provide a torquemeter whose responsive signal can vary responsively in time to provide time domain measurements.

It is still a further object of the present invention to provide a torquemeter which is not only light-weight, but also generates a strong, easily detected signal which are immune to electrical interference from nearby circuits, even at the lower and higher rotational speeds.

It is another object of the present invention to provide a torquemeter which is effective at extremely high rotational speeds.

It is yet a further object of the present invention to provide a torquemeter which is so wholly unobtrusive and simple that torque/horsepower measurement finally becomes a commonly used parameter for controlling rotating machinery.

SUMMARY OF INVENTION

All these and other objects are achieved by the present invention which provides a torquemeter comprising a magnetostrictive element formed in the shape of a ribbon upon the surface of the subject rotating member, which element is capable of producing internal, avalanche Barkhausen reversals, permanent magnets positioned adjacent to the subject rotating member for successively triggering the avalanche Barkhausen reversals in the magnetostrictive element and for resetting the magnetostrictive element after each reversal, a pickup coil for generating signals responsive to the avalanche Barkhausen reversals and a readout circuit for correlating the responsive signals to an indication of the level of torque in the subject rotating member. By reason that magnetostriction is modulating the avalanche Barkhausen reversals, the magnetostrictive element will generate signals which vary responsively to variations in the torsional loading.

The magnetostrictive element is preferably a multi-layered unit of only a few thousandths of an inch thick which is deposited, painted, particle bombarded or bonded to the surface of the subject rotating member. By reason that the magnetostrictive element generates a signal from an avalanche Barkhausen effect, the responsive signal can be made to be both strong and extremely short in time response, depending upon the velocity of the magnetic domain reversals rather than the rotational speed of the subject rotating member.

Other objects, advantages and novel features of the present invention will become apparent from the following detailed description of the invention when considered in conjunction with the accompanying drawing.

BRIEF DESCRIPTION OF THE DRAWINGS

In the drawings.

The same elements or parts througout the figures of the drawing are designated by the same reference characters, while equivalent elements bear a prime or double prime designation.

DETAILED DESCRIPTION OF THE PREFERRED EMBODIMENTS

Figure 1:
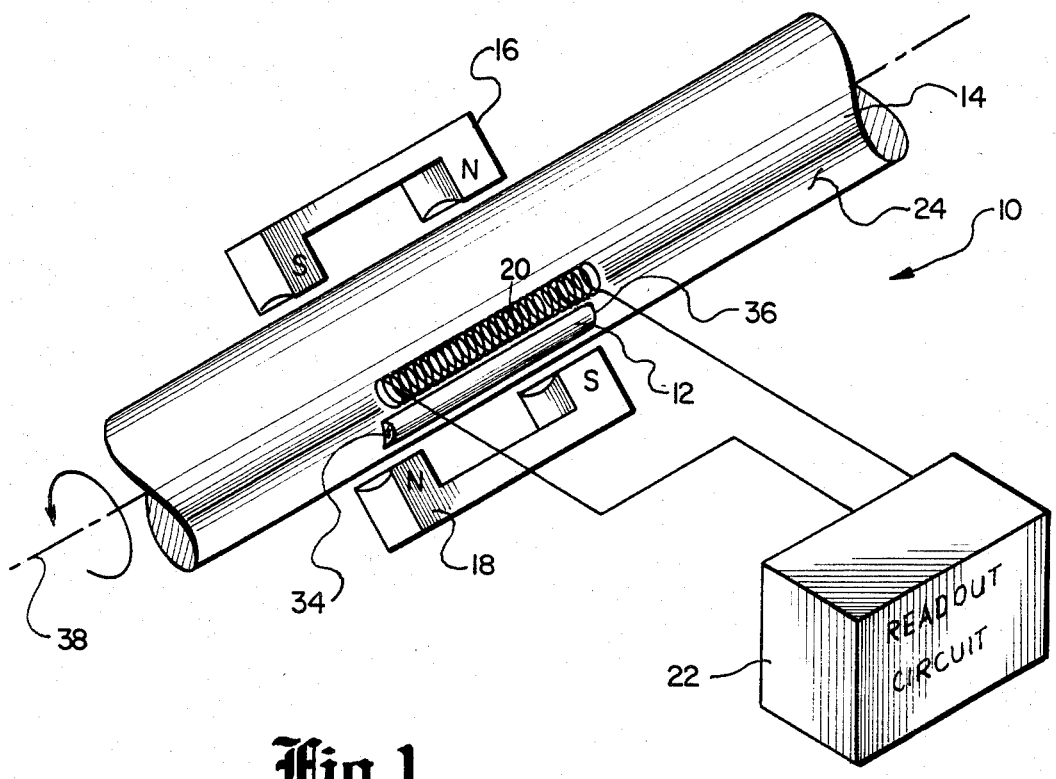
FIG. 1 is a schematic diagram of the preferred embodiment of present invention as applied to a rotating shaft.

Referring to FIG. 1, the present invention provides a torquemeter generally designated 10 and comprising a magnetostrictive element 12 formed upon rotating shaft 14 for generating avalanche type Barkhausen magnetic reversals, a reset magnet 16 for resetting magnetostrictive element 12 after each reversal, a triggering magnet 18 for precipitating the reversals in magnetostrictive element 12, a pickup coil 20 for generating a signal responsive to each avalanche Barkhausen reversal, and readout circuit 22 for correlating the responsive signal to an indication of the level of torque in shaft 14. All these elements, other than magnetostrictive element 12, are positioned proximate to rotating shaft 14 and in the vicinity of magnetostrictive element 12 by suitable external supports (not shown).

It is to be understood that rotating shaft 14 is representative of any rotating element experiencing a torsional load to be measured, such as a shaft of a reciprocating engine, a turbine engine, a compressor, a turbopump or the like. The applicability of the present invention goes far beyond these few examples as will become apparent in the discussion which follows.

Figure 3:
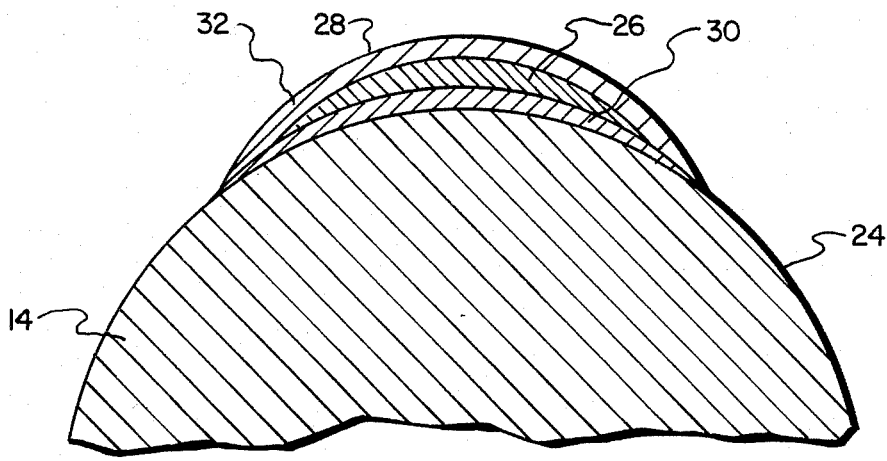
FIG. 3 is an enlarged cross-sectional end view of a portion of the shaft shown in FIG. 1 showing the internal structure of the preferred magnetostrictive element of the present invention.

Referring to FIGS. 1 and 3, magnetostrictive element 12 is preferably shaped like a ribbon upon the exterior surface 24 of shaft 14. For an example, on a shaft 14 of one inch diameter, magnetostrictive element 12 is approximately one inch long and an eighth of an inch wide. In all cases, magnetostrictive element 12 is preferably only a few thousandths of an inch thick so as to minimize any disturbance of the balance of shaft 14 and comprises a core 26 constructed from ferromagnetic material of low magnetic coercivity surrounded by an integrally formed jacket 28 constructed from ferromagnetic material of high magnetic coercivity. In forming the preferred embodiment of FIG. 3, a first layer 30 preferably comprising an alloy in the range of 75% iron and 25% nickel is first electroformed upon exterior surface 24 of shaft 14 to form the lower half of jacket 28. A layer of alloy in the range of 50% iron and 50% cobalt alloy is then electroformed upon first layer 30 to form core 26, whereupon a second layer 32 of approximately 75% iron and 25% nickel alloy is electroformed thereover to form the upper half of jacket 28. Layer 30 and 32 are preferably thicker than the material comprising core 26. In this fashion, layers 30 and 32 form a jacket 28 surrounding core 26. However, it is desireable that jacket 28 and core 26 co-terminate at ends 34 and 36 of magnetostrictive element 12 so that core 26 is exposed at ends 34 and 36. It is to be understood that although FIG. 3 portrays magnetostictive element 12 as creating a cognizable bulge on exterior surface 24 of shaft 14, in actual practice the bulge would be almost imperceptible and should be only a few thousandths of an inch high.

In denominating element 12 as being "magnetostrictive" it is meant that at least core 26, or both core 26 and jacket 28 of element 12 are magnetostrictive such that the extent and direction of the magnetization of element 12 is dependent upon the state of strain in element 12.

Figure 2:
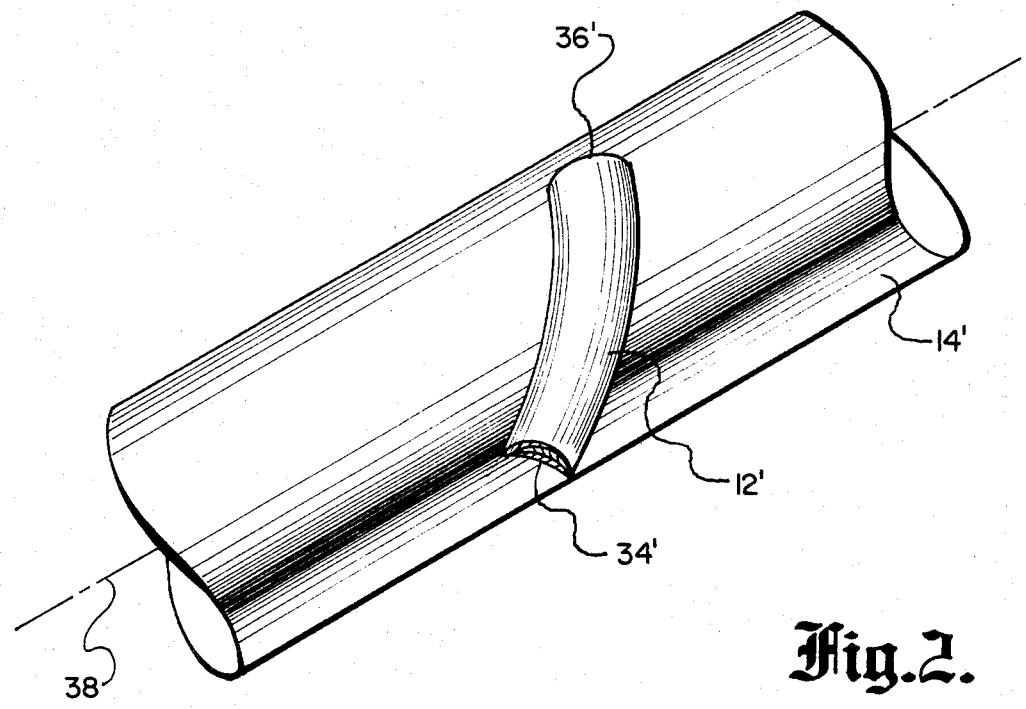
FIG. 2 is a schematic diagram of the magnetostrictive element of the present invention being formed onto a shaft at a 45° degree angle of alignment.
Figure 4:
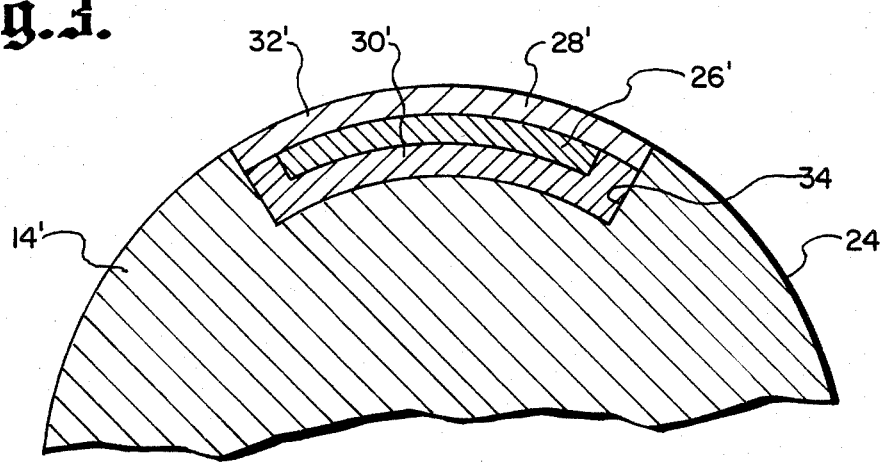
FIG. 4 is an enlarged cross-sectional end view of a portion of the shaft shown in FIG. 1 showing an alternate internal structure for the magnetostrictive element of the present invention.

The use of electrodeposition to form layers 30 and 32 and core 26 will assure that magnetostrictive element 12 will undergo the same mechanical strain as the adjacent regions of exterior surface 24 of shaft 14; however, other methods of joinder may be used to equal success and might be necessitated by the nature of the material comprising shaft 14. For instance, if shaft 14 is constructed from a nonconductive material such as a plastic or rubber, other processes such as chemical deposition, vapor deposition, sputtering, particle bombardment or painting might be used in forming the respective layers of material upon shaft 14. Referring to FIG. 4, it should also be noted that a recess 34' might be formed into surface 24, into which layers 30', 32', and core 26' might be deposited. Such construction maintains the continuity of surface 24, and also improves the torsional sensitivity of magnetostrictive element 12 by burying same into surface 24 of shaft 14. Note also that in FIG. 1, magnetostrictive element 12 is aligned with the direction of axis 38 of shaft 14; however, it is preferable to set element 12 at an angle of approximately 45° with respect to the direction of axis 38 as shown in FIG. 2 in order to maximize the torsional sensitivity of magnetostrictive element 12.

Materials other than those already specifically mentioned could be used in the construction of jacket 28 and core 26 of magnetostrictive element 12. It is generally preferred that the materials be selected such that the coercivity of jacket 28 is approximately ten (10) times or more than that of core 26. However, in some instances ratios less than ten will prove equally sufficient.

Figure 5:
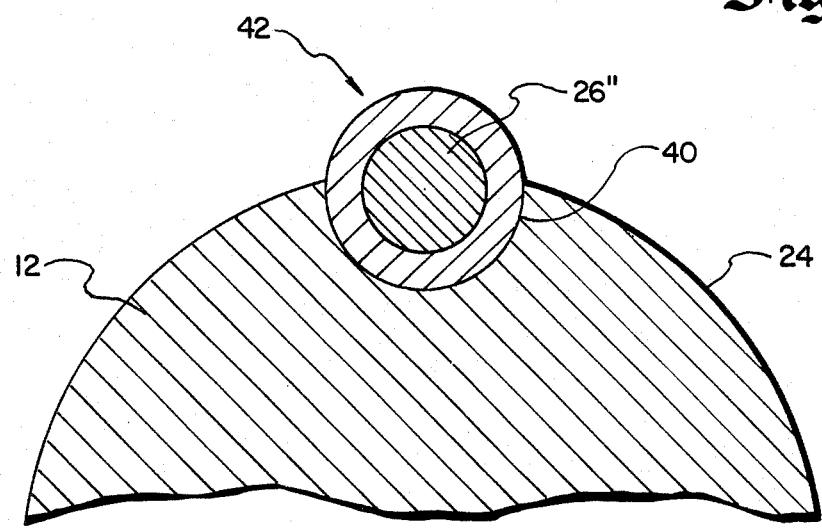
FIG. 5 is an enlarged cross-sectional end view of a portion of the shaft shown in FIG. 1 showing another internal structure for the magnetostrictive element of the present invention.

In FIG. 5, there is shown yet another embodiment of magnetostrictive element 12 of the present invention wherein an axially elongated semi-cylindrical groove 40 is formed in the surface 24 of shaft 12 by milling or similar technique. Magnetostrictive element 12 here comprises an elongated magnetostrictive wire 42 which is inserted into groove 40 and secured therein by bonding, brazing, or some other well-known means. Magnetostrictive wire 42 comprises a cylindrical core 26" of ferromagnetic material of low magnetic coercivity surrounded by an annular jacket 28" constructed from ferromagnetic material of high coercivity. By way of example, magnetostrictive wire 42 could be made from Permalloy or Vicalloy, whereby core 26" of wire 42 would have a magnetic coercivity of about 5 oersteds. To form jacket 28", wire 42 is work-hardened by twisting, for example, to produce in jacket 28" a coercivity of between 20 and 40 oersteds.

Figure 6:
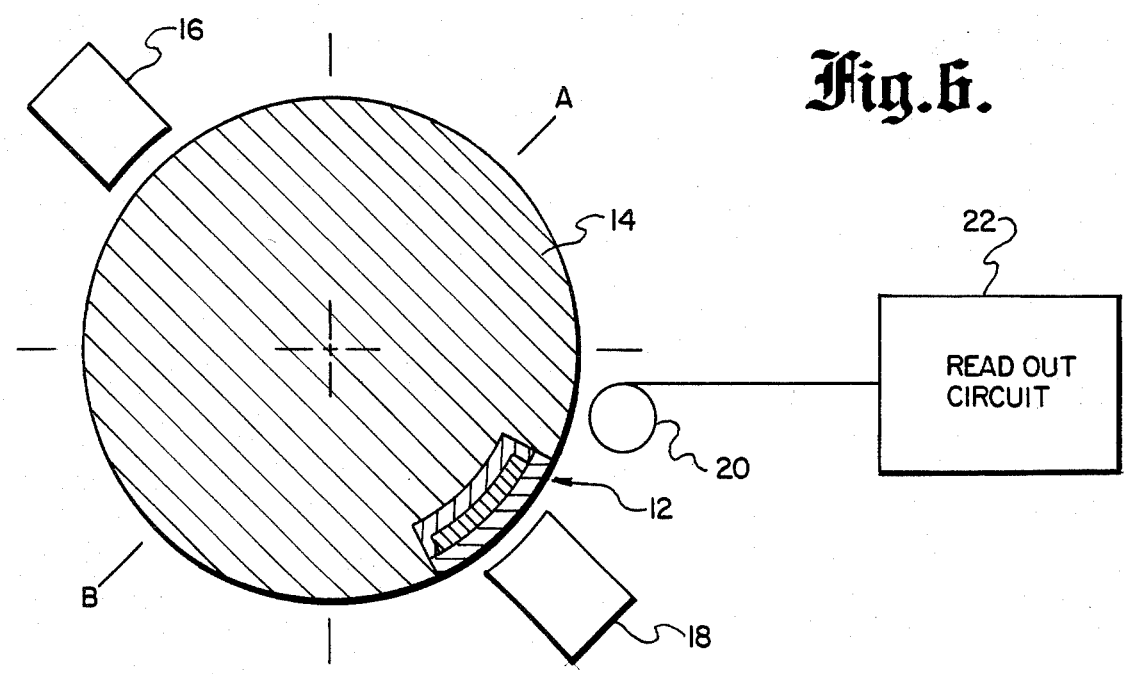
FIG. 6 is a schematic end view of the arrangement shown in FIG. 1 wherein arbitrary angular stations A and B are also indicated.

Referring now to FIG. 1 and 6, triggering magnet 18, reset magnet 16 and pickup coil 20 are positioned proximate to shaft 14 in the vicinity of the path of revolution of magnetostrictive element 12. As is shown by the letters "N" and "S" in FIG. 1, the polarity of reset magnet 16 is directed oppositely from that of triggering magnet 18, and the polarity of both are parallel to the direction of axis 38 of shaft 14. As is shown in FIG. 6, reset magnet 16 is preferably positioned about shaft 14 opposite from triggering magnet 18, although such positioning is not required. Instead, the magnets can be positioned relatively close together without impairing the functioning of the present invention. In most applications, a permanent magnet of approximately 150 oersted is suitable for use as triggering magnet 18 and a permanent magnet of approximately 50 oersted is usually sufficient for use as reset magnet 16.

Although the preferred embodiment is described as using permanent magnets, any equivalent elements might be used, such as one or more electromagnets. In the case of a single electromagnet, the polarity of same could be repetitively reversed to perform both the triggering and resetting functions.

As further shown in FIGS. 1 and 6, pickup coil 20 comprises a conductive wire wrapped into an inductive, helical coil which is connected to readout circuit 22. Pickup coil 20 is located proximate to both shaft 14 and triggering magnet 18 in the vicinity of the path of revolution of magnetostrictive element 12. A suitable pickup coil 20 for most applications can be constructed from 40 gauge wire wound to approximately 1000 turns.

Although the preferred embodiment is described as using a pickup coil, any equivalent devices might be used for the purpose of generating signals responsive to the avalanche Barkhausen reversals, such as Hall-effect detectors, capacitive detectors or electromagnetic antennas.

It is known that when ferromagnetic material is subjected to a magnetic field and the magnetic field is gradually increased, the magnetization of the material does not change smoothly. Instead, the magnetic domains within the material snap into alignment at different times as various magnetic field values are reached. This incremental snapping action is the well-known "Barkhausen jump". Recently, however, it has been discovered that it is possible to resonate the Barkhausen effect, such that the individual "Barkhausen jumps" occurs simultaneously within an element to thereby create a large abrupt change in magnetization which is referred to herein as an "avalanche Barkhausen reversal". Such reversals are described, for example, in the article "Wiegand's Wonderful Wires", *Popular Science Magazine*, May 1979, pp. 102–4, 165.

Referring to FIGS. 1 and 6, as magnetostictive element 12 rotates with shaft 14 in the arbitrary direction indicated by the curved arrow in those Figures, magnetostrictive element 12 passes sequentially by angular position labeled "A", then reset magnet 16, then angular station labeled "B", then triggering magnet 18 and pickup coil 20. It is to be understood that the exact locations of angular stations "A" and "B" are arbitrary and are intended only for denoting relative angular positions between respective elements of the present invention as is made clear by reference to FIG. 6.

Figure 7:
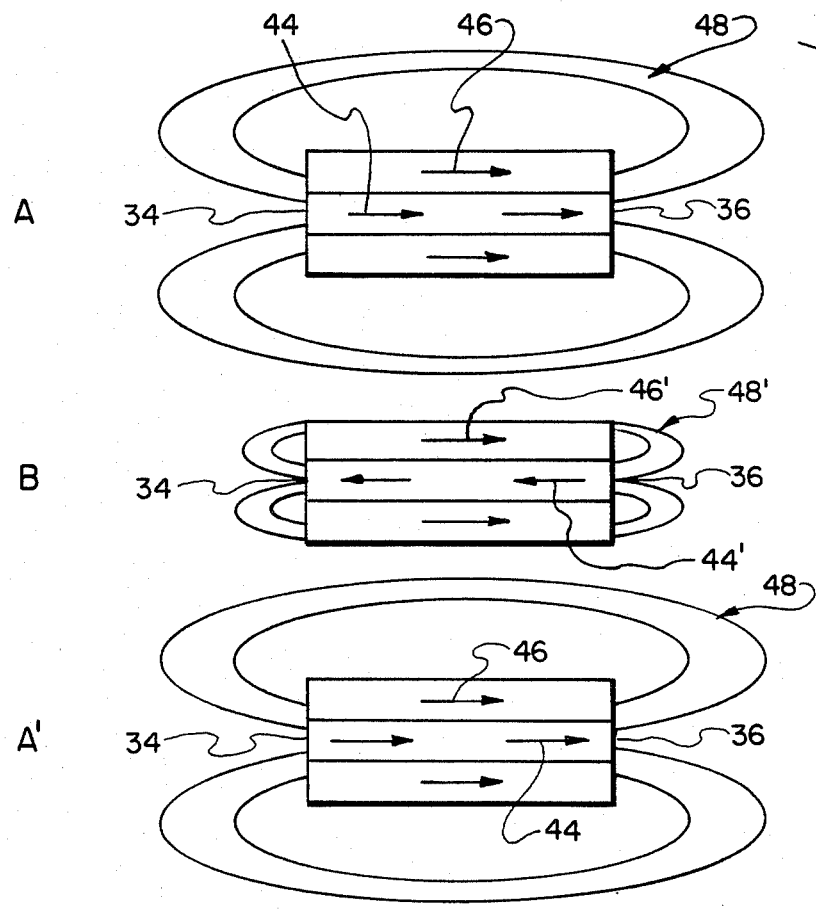
FIG. 7 is a schematic representation showing the respective polarities of the core and jacket portions of the magnetostrictive element when the element is passing by stations A and B and then A again

Now viewing FIG. 7 in conjunction with FIG. 6, one can perceive the changes in magnetization within magnetostrictive element 12 as it is revolved about axis 38 of shaft 14. At Station "A", magnetostrictive element 12 has just passed triggering magnet 18 which had placed magnetostrictive element 12 into its "triggered" state, wherein the magnetic polarity of core 26 is unidirectional with respect to the magnetic polarity of jacket 28. This condition is indicated by the arrows 44 representing the polarity of core 26 and arrows 46 representing the polarity of jacket 28 in the portion of FIG. 7 labelled "A". The lines generally designated 48 indicate lines of magnetic inductance and thus the net magnetic field strain of magnetostrictive element 12 at station "A". As magnetostrictive element 12 passes by station "B" as represented by the portion of FIG. 7 labelled "B", element 12 is now in its "reset state" by reason that it had just passed reset magnet 16. In its reset state, the magnetic polarity of core 26 has been reversed with respect to the magnetic polarity of jacket 28 as indicated by arrows 44' and 46'. Then in passing back again to station "A", magnetostrictive element 12 passes once again under triggering magnet 18, whereupon the core polarity is suddenly and abruptly reversed to its triggered condition as shown by the representation at "A'" in FIG. 7. This abrupt reversal is the aforementioned avalanche Barkhausen reversal and it produces an almost ideal voltage pulse in pickup coil 20 such that no power source is required for pickup coil 20, and such that a pulse is substantially non-rate sensitive. The usual pulse to be expected from an element constructed according to the preferred embodiment is approximately 800 millivolts, which magnitude allays the need for an amplifier for processing the signal generated in pickup coil 20. Note also that the voltage pulse generated by the resetting of the core polarity 44 is small in comparison to the voltage pulse generated Avalanche Barkhausen reversal initiated by triggering magnet 18. The former pulse can be filtered out of the responsive signal of pickup coil 20 by the addition of well-known filter circuitry to the readout circuit 22.

Figure 8:
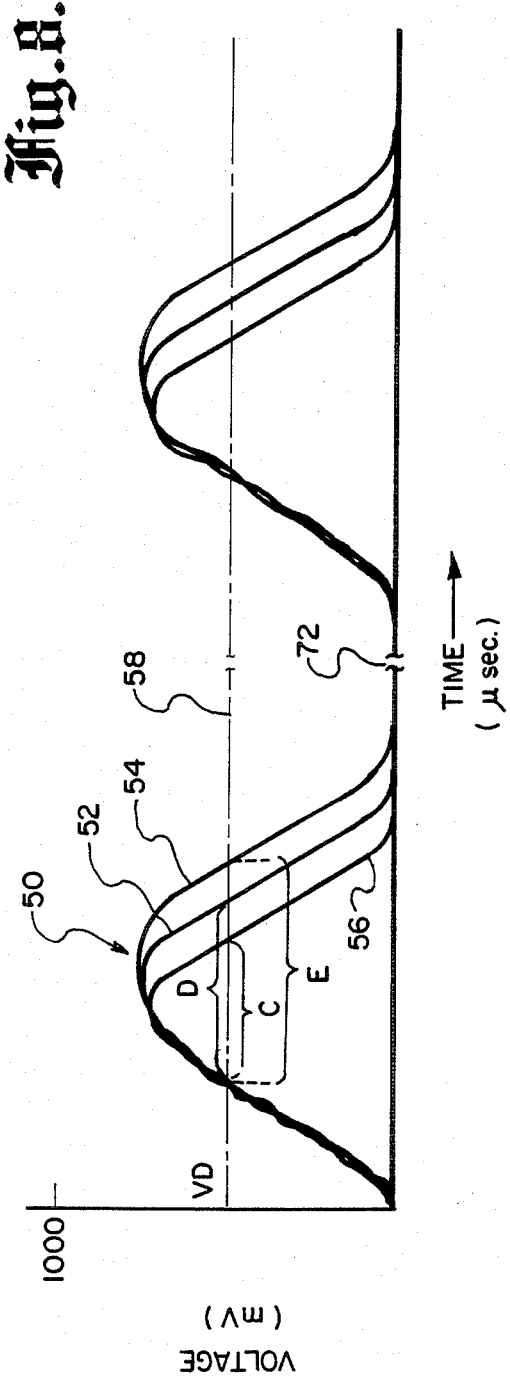
FIG. 8 is a graphical representation of voltage pulses generated in a pick-up coil.

Referring now to FIG. 8, the form of the voltage pulses (generally designated 50) generated in pickup coil 20 by the aforementioned avalanche Barkhausen reversals varies in measureable fashion with respect to the torsional stress within shaft 14. When shaft 14 is torsionally stressed, it mechanically twists about axis 38 in an amount proportional to the transmitted torque. This twisting, in turn, mechanically loads and displaces magnetostrictive elements 12 such that the aforementioned avalanche Barkhausen reversals in element 12 are proportionally affected. Pickup coil 20 in conjunction with readout circuit 22 detect and measure these changes in the respective avalanche Barkhausen reversals as indicated by one or more changes in the characteristics of voltage pulses 50 induced in pickup coil 20. The quotient of the torsional loading divided by the period of rotation of shaft 14, which can be readily measured by well-known circuitry from the period of pulses generated by pickup coil 20, represents the horsepower transmitted by shaft 14. Accordingly, readout circuit 22 can produce a signal representative of torque and/or horsepower.

Voltage pulses 50 depicted in FIG. 8 are generally representative of those obtainable from a magnetostrictive element 12 constructed according to the preferred embodiment of the present invention. It is to be understood that line 52 depicts pulses generated by magnetostrictive element 12 when shaft 14 is under no torsional loading, that line 54 represents pulses generated by magnetostrictive element 12 when shaft 14 is torsionally loaded in one angular direction and that line 56 represents a pulse generated when shaft 14 is torsionally loaded in an equal but opposite manner from that represented in line 54. All pulses are taken at an arbitrary but fixed rotational speed of shaft 14. As is apparent, voltage pulses 54 and 56 vary primarily in pulsewidth with respect to voltage pulse 52 as torsional loading of shaft 14 is varied, as indicated by the differences between the pulsewidth indicated by the letter "D" in FIG. 8 corresponding to the pulse width of voltage pulse 52 and pulsewidths "C" and "E" of voltage pulses 56 and 54, respectively. The determination of pulsewidth is predicated upon a preselection of a voltage discriminator level as indicated by the dotted line 58 in FIG. 8 which is a voltage level less than that of the peak amplitude of voltage pulses 52, 54 or 56.

Figure 9:
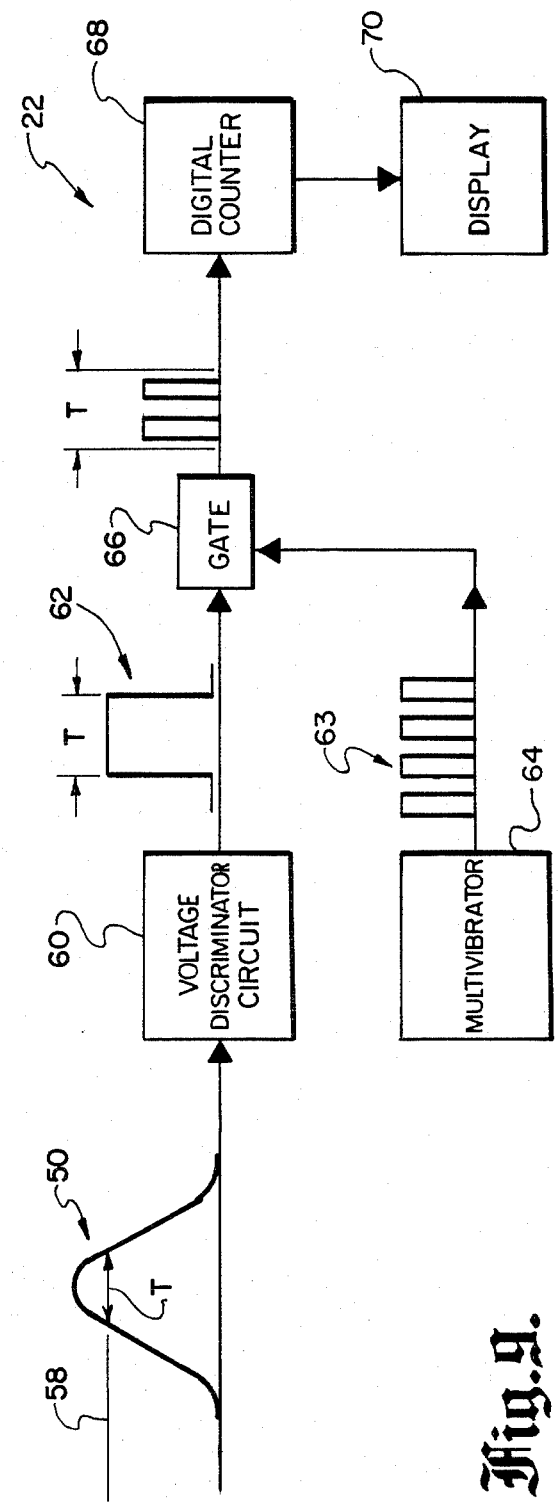
FIG. 9 is a schematic representation of the readout circuit and representative voltage pulse.

Referring now to FIG. 9, there is shown elements which preferably comprise readout circuit 22. Also shown in FIG. 9 in schematic form is a representative voltage pulse 50 from pickup coil 20 entering readout circuit 22, which pulse 50 has a pulsewidth T as determined by the voltage discriminator level 58 as previously discussed. Readout circuit 22 includes a voltage discriminator circuit 60 which detects when representative voltage pulse 50 rises to and falls below voltage discriminator level 58 and generates a square-wave output signal 62 which has a period equal to pulsewidth T of the original voltage pulse 50. Readout circuit 22 further comprises multivibrator 64 and electrical gate 68 for superimposing pulses 63 from multivibrator 64 on square-wave output signal 62. A digital counter 68 then measures period T of the square-wave signal 62 by measuring the number of superimposed pulses from multivibrator 64 contained within each pulsewidth T. Display element 70 of readout circuitry 22 then processes the output of digital counter 68 to correlate same with an indication of the level of torque and/or horsepower in shaft 14. In this manner, torquemeter 10 advantageously provides a time based digital output reading of torque.

Other readout circuits could be utilized with equal success. For instance, readout circuit 22 could be constructed to generate an analog signal proportional to the peak value of voltage pulses 50. In using this method of correlation, one will find that the signals derived from pickup coil 20 will vary in amplitude with respect to changes in the torsional loading of shaft 14 in a manner which is independent of the rotational speed of shaft 14. In other words, the amplitude of signals generated by torquemeter 10 is independent of the rotational speed of shaft 14. Another readout circuit 22 could be constructed to correlate changes in the integral of the voltage pulses 50 to the levels of torque, and yet another could be constructed to correlate levels of torque from changes in derivatives taken at one or more points along voltage pulses 50. Designs for these readout circuits 22 are set forth in U.S. Pat. No. 4,446,161 issued Nov. 22, 1983 incorporated herein by reference.

Referring to FIG. 8, it should be noted that there is a break 72 in the representation of voltage pulses 52, 54 and 56 to signify that the pulses are more widely separated than FIG. 8 seems to suggest. The break is important because voltage pulses 50 consume only a small fraction of the total cyclical period of the signals generated in pickup coil 20 by reason that they are the result of the abrupt avalanche Barkhausen reversals of magnetic polarity in magnetostrictive element 12. Because of this abruptness and shortness of duration, the present invention can be applied to shaft speeds up to 500,000 rpm or more, speeds which devices of the prior art are incapable of handling effectively. Moreover, the characteristics of pulses derived from the described changes in magnetization are not appreciably affected by the speed of shaft rotation, particularly with respect to amplitude. Thus, their detection can be used as an accurate measure of torque for a broad range of rotational speeds including low-speed startups and shutdowns. Further, the invention permits the convenient derivation of a signal representative of power from a single readout signal. Since the ferromagnetic regions can be formed on the shaft without cement if desired, erratic drift over time can also be avoided. Moreover, magnetostrictive element 12 adds very little mass to shaft 14, and no mechanical contact with shaft 14 is required to transmit torsionally responsive pulses 50 to readout circuit 22. Thus, torquemeter 10 preserves the original balance of shaft 14. Moreover, because voltage pulses 50 are so strong, their detection and processing can be accomplished without costly amplification equipment. By providing these and other advantages, such as its unobtrusiveness and simplicity, torquemeter 10 will likely cause torque/horsepower measurement to finally become a commonly used parameter for controlling rotating machinery.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method for measuring levels of torque in a rotating member comprising the steps of:
    forming onto said rotating member a magnetostrictive element comprising a core constructed from material of low magnetic coercivity and a jacket about said core constructed from material of high magnetic coercivity;
    resetting the magnetic polarity of said core from a triggered state wherein said core polarity is unidirectional with respect to the magnetic polarity of said jacket to a reset state wherein said core polarity is oppositely directed with respect to said jacket polarity;
    triggering an avalanche Barkhausen reversal of said core polarity from said reset state to said triggered state;
    generating a signal responsive to said avalanche Barkhausen reversal; and
    correlating said responsive signal to an indication of the level of torque in said rotating member.

2. The method claimed in claim 1 wherein said element forming step includes electrodeposition.

3. The method claimed in claim 1 wherein said resetting step and said triggering step includes the placement of magnets proximate to said rotating member and in the vicinity of said element.

4. The method claimed in claim 3 wherein said magnetostrictive element is constructed at least partially from a ferromagnetic alloy.

5. The method claimed in claim 4 wherein said ferromagnetic alloy comprises iron-nickel-cobalt.

6. The method claimed in claim 4 wherein said core is constructed from an alloy in the range of 50 percent iron and 50 percent cobalt and said jacket is constructed from an alloy in the range of 75 percent iron and 25 percent nickel alloy.

7. The method claimed in claim 3 wherein said method further comprises the steps of measuring the rotary speed of said rotating member from said responsive signal and calculating power from said indication of the level of torque and said rotary speed.

8. The method claimed in claim 3 wherein said correlating step comprises a step of taking a time based digital measurement of the pulsewidth of said responsive signal.

9. An apparatus for measuring levels of torque in a rotating member comprising:
    a magnetostrictive element formed onto said rotating member comprising a core constructed from material of low magnetic coercivity and a jacket about said core constructed from material of high magnetic coercivity;
    reset means for resetting the magnetic polarity of said core from a triggered state wherein said core polarity is unidirectional with respect to the magnetic polarity of said jacket to a reset state wherein said core polarity is directed oppositely with respect to said jacket polarity;
    triggering means for triggering an avalanche Barkhausen reversal of said core polarity from said reset state to said triggered state;
    means for generating a signal responsive to said avalanche Barkhausen reversal; and
    means for correlating said responsive signal to an indication of the level of torque in said shaft.

10. The apparatus claimed in claim 9 wherein said reset means, said triggering means, said signal generating means and said correlating means are set apart from said rotating member.

11. The apparatus claimed in claim 10 wherein said reset means and said triggering means comprise magnets positioned proximate to said rotating member and in the vicinity of said magnetostrictive element.

12. The apparatus claimed in claim 11 wherein means for generating a responsive signal comprises a pickup coil.

13. The apparatus claimed in claim 12 wherein said magnetostrictive element is at least partially constructed from a ferromagnetic alloy.

14. The apparatus claimed in claim 13 wherein said ferromagnetic alloy comprises iron-nickel-cobalt.

15. The apparatus claimed in claim 12 wherein said core is constructed from an alloy in the range of 50 percent iron and 50 percent cobalt and said jacket is constructed from an alloy in the range of 75 percent iron and 25 percent nickel.

16. The apparatus claimed in claim 12 wherein said correlating means comprises a readout circuit for generating a time based digital measurement of the pulsewidth of said responsive signal.

17. The apparatus claimed in claim 12 wherein said correlating means comprises a readout circuit for detecting the amplitude of said responsive signal.

18. The apparatus claimed in claim 12 wherein said correlating means comprises a readout circuit for integrating said responsive signal.

19. The apparatus claimed in claim 12 wherein said correlating means comprises a readout circuit for differentiating said responsive signal.

20. An apparatus for measuring levels of torque in a rotating member comprising:
    a magnetostrictive element formed onto said member capable of producing avalanche Barkhasuen reversals;
    means for successively triggering avalanche Barkhausen reversals in said magnetostrictive element and for resetting said magnetostrictive element after each reversal;
    means for generating a signal responsive to said avalanche Barkhausen reversals; and
    means for correlating said responsive signal to an indication of the level of torque in said member.

* * * * *